Nov. 10, 1936.        A. S. NORCROSS        2,060,106
ALTERNATING CURRENT MOTOR
Filed Aug. 19, 1935
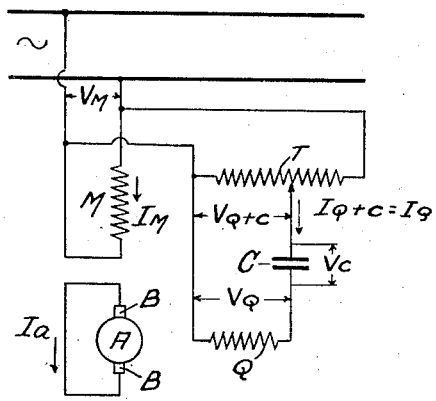
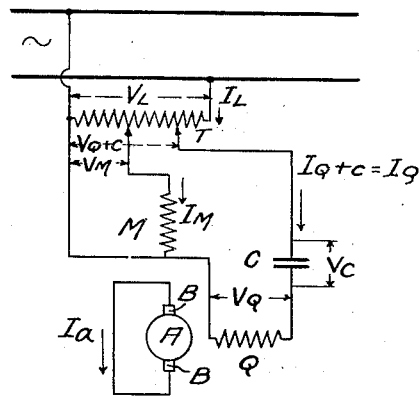
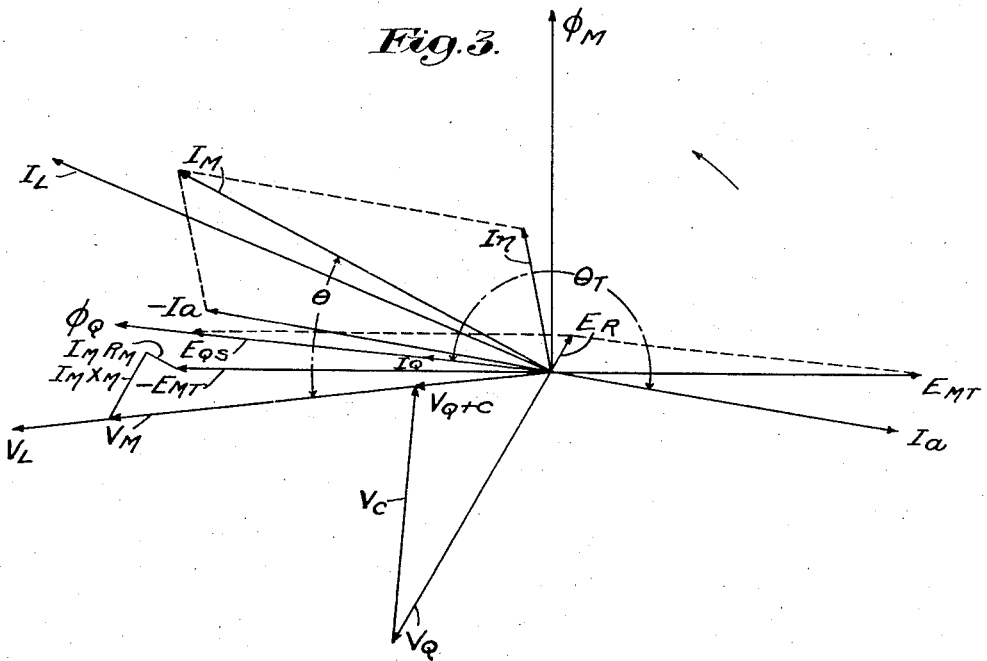
Inventor:
Austin S. Norcross
Attys Patented Nov. 10, 1936

2,060,106

UNITED STATES PATENT OFFICE 2,060,106

ALTERNATING CURRENT MOTOR

Austin S. Norcross, Newton, Mass.

Application August 19, 1935, Serial No. 36,789

8 Claims. (Cl. 172—277)

This invention relates to electric motors for operation on alternating current, and the object is to provide a motor of this type operable at different speeds. The example of the invention herein described may be characterized as an adjustable speed, single-phase commutator motor having shunt speed characteristics. The motor has a wide range of speed and its speed is little affected by variations in load. High torque, a good power factor and good efficiency are attained in operation and starting conditions are favorable.

The principles of my invention may conveniently be understood by reference to the following description of illustrative embodiments thereof, as shown by way of example in the accompanying drawing, wherein:

Fig. 1 is a circuit diagram of the motor;

Fig. 2 is a similar diagram of a modified form; and

Fig. 3 is a vector diagram indicating the time phase relations of the fluxes, voltages and currents existing in the motor under running conditions.

Referring to Fig. 1, I have there shown diagrammatically a motor with stator windings embodying a field coil M, which for convenience may be denominated the main coil or winding, and is energized as indicated directly from a suitable source of supply of alternating current. A second winding Q, connected in parallel to the main winding M, is located ninety electrical degrees apart therefrom. In other words, the coils M and Q are in space quadrature and for convenience I will refer to the winding Q as the quadrature winding. Herein I have shown a capacitor C in the circuit of the winding Q, this being illustrative of suitable means providing for a differential in time phase between the windings M and Q, the differential being substantially less than 90° as hereinafter more fully explained. The voltage supplied to the coil Q is adapted to be adjustably varied in magnitude (but not in phase) and I have herein illustrated an auto-transformer T as interposed between the source of current supply and the winding.

The armature A rotates within the stator and is provided with a commutator having brushes B which short circuit the same substantially on the axis of the main winding M. In the drawing they are shown on the axis, although they might in some instances be slightly displaced from the axial line for purposes of regulation, as will be apparent to those skilled in the art.

Having thus didactically described the disposition of the various parts illustrated in Fig. 1, the electrical and mechanical effect resulting therefrom may be briefly summarized as follows: The reaction between the current flowing in the armature, which is the result of a voltage made up of that induced by transformer action from winding M and a speed voltage due to the flux from Q, and the flux $\Phi_Q$ set up by the quadrature winding Q results in a torque which rotates the armature, the value of the torque being determined by the fundamental equation:

$$T = K\Phi_Q I_a \cos \theta_T \qquad (1)$$

wherein T is the torque, K is a constant of proportionality and $\theta_T$ is the angle between the armature current, $I_a$, and the quadrature field flux $\Phi_Q$. The motor will operate at a speed which in accordance with the equation:

$$E_{QS} = K\Phi_Q n \qquad (2)$$

wherein $n$ is the speed multiplied by the number of pairs of poles, will produce a speed voltage, $E_{QS}$ (generated in the armature from the quadrature field flux, $\Phi_Q$), which when added to the transformer voltage, $E_{MT}$ (induced in the armature from the main field flux) will produce a resultant armature voltage, $E_R$, which will in turn produce an armature current, $I_a$, of correct phase and magnitude to satisfy Equation (1). The voltage $E_{QS}$ to satisfy this relation may be obtained at various speeds by varying the magnitude of voltage $V_{Q+C}$ supplied to the quadrature winding and capacitor and consequently the value of $\Phi_Q$, the flux in the quadrature field.

To obtain a practically useful motor, however, with adequate torque and other favorable characteristics, the angle $\theta_T$ should be such that its cosine as a factor in Equation (1) is nearly unity, a result obtained when it approximates either zero or a "straight angle", or 180°. The algebraic sign of the cosine affects the direction of rotation. This I effect by providing a differential in time phase between main winding M and quadrature winding Q (as by suitably fixing the magnitude of capacitor C) substantially different from 90° as above stated. In practice I have found for such designs of motor as I have used a quadrature voltage leading the main field voltage by about seventy degrees to give excellent results, which figure I give by way of example, and without limitation thereto. The condition may be perhaps more fundamentally expressed by saying that the differential is such as to provide a resultant voltage due to the transformer and speed voltages of the armature, which resultant voltage leads the transformer voltage.

The matter may be more fully understood by reference to the vector diagram, Fig. 3. This is a time diagram showing only relative time phase, the transformer voltage, $E_{MT}$, induced in the armature from the main field flux, $\Phi_M$, being arbitrarily taken along the X axis. The drawing is further a diagram in that it is not to scale, the length of the vectors not accurately representing magnitudes, and in that the angular positions of the vectors while generally exhibiting their relation have been somewhat arbitrarily drawn to promote clearness and an open diagram. All vectors are supposed to rotate in a counter-clockwise direction, as indicated by the arrow, at a speed which is determined by the supply frequency.

Let me assume a main field voltage $V_M$ as shown. As this is the voltage actually applied to the main field, the voltage induced in the main field will be less than $V_M$ by the resistance and leakage reactance drops in the main field, $I_M R_M$ and $I_M X_M$, respectively. In addition to inducing the voltage $E_{MT}$ in the main winding, the flux $\Phi_M$ induces a voltage $E_{MT}$ in the armature.

Considering now the quadrature field, the voltage $V_{Q+C}$ applied to its circuit has two components, one, $V_C$, across the capacitor, and the other, $V_Q$, across the quadrature winding. In accordance with my invention, the magnitude of the capacitor C is so chosen in connection with the other constants of the circuit as to give a quadrature field current, $I_Q$, which lags $E_{MT}$ by more than 180°, or, as earlier stated herein, $V_Q$ leads $V_M$ by substantially less than ninety degrees whereby $I_Q$, which lags its voltage by somewhat less than ninety degrees depending on the design of the motor, will lag $E_{MT}$ by somewhat more than 180°. As the current through a capacitor leads its voltage by ninety degrees, the capacitor voltage $V_C$ will take the position shown. Likewise the inductance of the quadrature field causes the current to lag its voltage by somewhat less than ninety degrees, so that the actual quadrature field voltage is given by the position of $V_Q$.

The quadrature field current $I_Q$ produces a flux $\Phi_Q$, which may be assumed to be in phase with it. With the armature rotating in the flux $\Phi_Q$ there is generated in the armature a speed voltage, $E_{QS}$, in phase with the flux. I now have in the armature two voltages, a transformer voltage, $E_{MT}$, and a speed voltage, $E_{QS}$. These two voltages combine to give a resultant voltage, $E_R$, which because of the position of the latter relative to the former leads $E_{MT}$. The resultant voltage $E_R$ causes the armature current $I_a$ to flow to supply torque by reaction with the quadrature field flux $\Phi_Q$. The circuit $I_a$ will adjust itself to satisfy the conditions expressed by Equation (1).

If I consider the torque it will be understood that, since the magnitude of the capacitor has caused $V_Q$ to lead $V_M$ by substantially less than ninety degrees and $\Phi_Q$ therefore to lag $E_{MT}$ by more than 180°, $E_R$ will lead $E_{MT}$ and therefore the armature current $I_a$, which lags $E_R$ by a definite amount depending on the design of the motor, will lag $E_{MT}$ by a relatively small angle, making the angle $\theta_T$ differ by a small amount from 180° and the torque high, whereas if $V_Q$ led $V_M$ by substantially ninety degrees $\Phi_Q$, lagging $V_Q$ by less than a quadrant, would lag $E_{MT}$ by less than 180°, and the voltage $E_{QS}$ depending on $\Phi_Q$, would give a resultant voltage $E_R$ lagging $E_{MT}$. The armature current would then lag $E_{MT}$ by a large angle and angle $\theta_T$ would vary by a large amount from a straight angle (180°), its cosine would be small and the torque so low that the motor would be impractical.

Considering the matter of adjusting speed, it should be clear from Fig. 3 that this can be accomplished by adjusting $V_{Q+C}$ and consequently $\Phi_Q$. The motor will change speed as $\Phi_Q$ is adjusted in order to generate substantially the same $E_{QS}$ (see Equation 2) which is necessary in order that $E_{QS}$ and $E_{MT}$ produce a voltage $E_R$ which will cause an armature current of the necessary phase and magnitude to satisfy Equation 1.

It will be obvious to those skilled in the art that adjusting $V_M$ will regulate $E_{MT}$ and therefore also adjust speed.

In certain designs of motor, I have found that a greater speed range is attained and operating conditions improved by providing means for adjusting the voltage applied to the main field winding M in correlation with the adjustment made in the voltage applied to the quadrate field winding Q. A motor arranged for such adjustment is diagrammed in Fig. 2.

Referring again to Fig. 3, the current $I_a$ flowing in the armature is neutralized by a current $-I_a$ flowing in the stator. There is also flowing in the stator a magnetizing and core loss current, $I_n$, which when added vectorially to $-I_a$ gives the resultant stator current $I_M$. The stator current $I_M$ is the actual current flowing in the stator. The line current $I_L$ is the vector sum of the main field current $I_M$ and the quadrature field current $I_Q$.

A particular motor constructed in accordance with the principles of the invention has exhibited high efficiency, good power factor and high torque. The motor starts easily under load. The change of speed due to changes in load is relatively small. A speed variation of between 800 and 2400 R. P. M. has been attained while maintaining good operating conditions by varying voltage to the quadrature field only. By varying both the main and quadrature field voltages, a much larger speed range has been obtained. Commutation under normal operating conditions is decidedly better than that of an ordinary series alternating-current motor and remains satisfactory over a wide range of speeds.

It will be clear to those skilled in the art that the direction of rotation of the motor may be reversed by suitably changing the leads. In that case, the disposition of vectors would of course be substantially different in detail from Fig. 3, but subject to similar analysis.

For convenience, I append a list of the symbols used in this specification in referring to the various electric forces considered.

$V_L$ = supply voltage
$V_M$ = voltage impressed upon main winding winding and series capacitor
$V_{Q+C}$ = voltage impressed upon quadrature
$V_C$ = capacitor voltage
$V_Q$ = quadrature field voltage
$I_M R_M$ = resistance drop in main field winding
$I_M X_M$ = leakage reactance drop in main field winding
$-E_{MT}$ = induced voltage in main field winding
$E_{MT}$ = transformer voltage induced in armature from main field flux
$I_Q$ = quadrature field current lagging $V_Q$ by the impedance angle of quadrature field $\Phi_Q$ = quadrature field flux produced by $I_Q$ $E_{QS}$ = speed voltage generated in armature from quadrature field flux $E_R$ = resulting armature voltage, vector sum of $E_{MT}$ and $E_{QS}$ $I_a$ = armature current produced by $E_R$ and lagging it by the impedance angle of the armature $-I_a$ = stator component to neutralize the armature current $I_n$ = stator component to supply $\Phi_M$ and main field iron losses $I_M$ = main field current, vector sum of $-I_a$ and $I_n$ $I_L$ = total line current $\Phi_M$ = main field flux $\theta$ = power factor angle $\theta_T$ = angle between $I_a$ and $\Phi_Q$ Fundamental expressions $$T = K \Phi_Q I_a \cos \theta_T \quad (1)$$
$$E_{QS} = K \Phi_Q n \quad (2)$$
$$E_{MT} = K \Phi_M f \quad (3)$$

Where  $T$ = torque $n$ = speed multiplied by number of pairs of poles $f$ = frequency Power input $= V_L I_L \cos \theta$ Power factor $= \cos \theta$ I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. An alternating current motor comprising a field winding, a rotor having a commutator and brushes disposed to short circuit the rotor substantially along the axis of said field winding, a quadrature winding spaced ninety electrical degrees from the field winding connected in parallel thereto and having in its circuit a capacitor of such a magnitude as to provide in the rotor a voltage resultant of the transformer and speed voltages, which resultant voltage leads the transformer voltage, and a voltage regulator in said circuit whereby to provide for varying the speed of the motor.

2. An alternating current motor comprising a field winding, a rotor having a commutator and brushes disposed to short circuit the rotor substantially along the axis of said field winding, a quadrature winding spaced ninety electrical degrees from the field winding connected in parallel thereto and having in its circuit a capacitor of such a magnitude as to provide a flux in the quadrature field lagging the armature transformer voltage by somewhat more than 180°, and a voltage regulator in said circuit whereby to provide for varying the speed of the motor.

3. An alternating current motor comprising a field winding, a rotor having a commutator and brushes disposed to short circuit the rotor substantially along the axis of said field winding, a quadrature winding spaced ninety electrical degrees from the field winding connected in parallel thereto, dephasing means in the circuit of said latter winding comprising a capacitor of such magnitude as to dephase the circuit of the quadrature winding relatively to the main winding by an amount substantially differing from ninety degrees to produce an angle having a large cosine between the armature current and the quadrature field flux and a voltage regulator in said circuit whereby to provide for varying the speed of the motor.

4. An alternating current motor comprising a field winding, a rotor having a commutator and brushes disposed to short circuit the rotor substantially along the axis of said field winding, a quadrature winding spaced ninety electrical degrees from the field winding connected in parallel thereto, dephasing means in the circuit of the latter winding comprising a capacitor of such a magnitude as to cause the voltage of the quadrature winding to lead the voltage of the main field by an angle substantially less than ninety degrees and to cause the current therein lagging the voltage by the impedance angle of the quadrate field to lag the armature transformer voltage by more than 180°, and a voltage regulator in said circuit whereby to provide for varying the speed of the motor.

5. A motor as defined in claim 1, wherein means are provided for independently varying the voltage applied to the main winding.

6. A motor as defined in claim 2, wherein means are provided for independently varying the voltage applied to the main winding.

7. A motor as defined in claim 3, wherein means are provided for independently varying the voltage applied to the main winding.

8. A motor as defined in claim 4, wherein means are provided for independently varying the voltage applied to the main winding.

AUSTIN S. NORCROSS.

CERTIFICATE OF CORRECTION.

Patent No. 2,060,106.  November 10, 1936.

AUSTIN S. NORCROSS.

It is hereby certified that error appears in the printed specification of the above numbered patent requiring correction as follows: Page 2, first column, line 19, for "me" read us; lines 51 and 62, for "I" read we; line 59, for "circuit" read current; and second column, line 63, in the equation, strike out the words "winding and series capacitor" and insert the same after "quadrature", same column, line 64; and that the said Letters Patent should be read with these corrections therein that the same may conform to the record of the case in the Patent Office.

Signed and sealed this 26th day of January, A. D. 1937.

Henry Van Arsdale (Seal)  Acting Commissioner of Patents.